May 21, 1957   J. J. DONEGAN   2,793,008
MULTIPLE SPACED-PIPE ASSEMBLIES
Filed July 23, 1954

INVENTOR:
Jos. J. Donegan,
BY Chas.W.Gerard.
ATTORNEY.

United States Patent Office 2,793,008
Patented May 21, 1957

2,793,008

MULTIPLE SPACED-PIPE ASSEMBLIES

Joseph J. Donegan, Kansas City, Mo.

Application July 23, 1954, Serial No. 445,319

1 Claim. (Cl. 257—262.15)

The present invention relates to multiple-wall pipe structures or assemblies, such as are employed in heating or in heat-exchange operations requiring a plurality of adjoining tubular passages for conducting or venting of gas flows and for either heat-exchange or air-insulating purposes.

Accordingly, a primary purpose of the invention is to provide a more efficient pipe or conduit structure or assembly of conduit passages in appropriately spaced relation as, for example, in telescoping and approximately concentric relation as required in flue or vent outlet constructions as well as for the carrying out of the heating or heat-exchange functions required of apparatus in this class of construction.

As a practical embodiment of such improved construction, I have devised a pipe or conduit assembly, combined with rod or pin connections adapted to be readily anchored in position for both securing and spacing the several pipes or conduits of the assembly in the desired separated or spaced relation.

A further object of my invention is to provide an improved pipe assembly of the type indicated, and which is not only of maximum simplicity and efficiency but also of a character which may be assembled and produced at a minimum of cost.

With the foregoing general objects in view, the invention will now be described by reference to the accompanying drawing illustrating typical units of construction which I have devised for embodying the proposed features of improvement, after which the particular points or combinations deemed to be novel and patentable will be set forth and claimed.

In the drawing—

Figure 1:
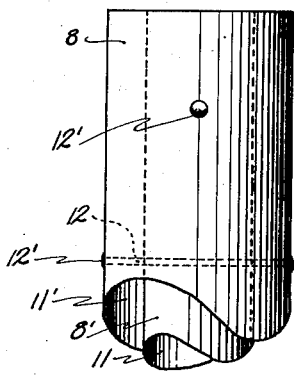
Figure 1 is an elevation showing a multiple-pipe assembly and including transverse rod or pin connections arranged in accordance with the present invention.
Figure 2:
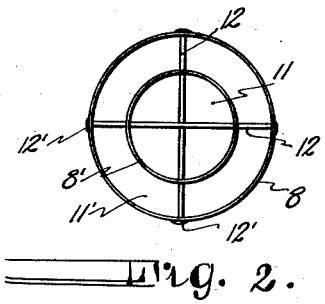
Figure 2 is a plan view of the assembly illustrated in Figure 1.

Referring now to the accompanying drawing in detail, and more particularly to Figures 1 and 2, these views illustrate a multiple-pipe assembly comprising pipes or conduits 8 and 8' of different diameters and adapted to be arranged or assembled in telescoping and approximately concentric but spaced relation and thus providing a central gas flow passage 11 surrounded by an outer annular passage 11', as is common practice in the construction of apparatus providing for the venting of hot gases or fumes, as required, for example, in various types of furnace vents or outlet construction.

As my improved means for retaining the pipes 8 and 8' securely in their illustrated spaced and telescoping relation, I employ a suitable number of pin or rod elements 12 mounted in corresponding openings 14 produced by puncturing or piercing approximately diametrically through the walls of the pipes. The resulting relationship of said openings 14 is such that when the rods are mounted therein they will extend in various or somewhat different angular relation to each other. This assures that the said rod connections will not only hold the pipes against any longitudinal shifting movement, but also against any relative shifting movement laterally, with the result that the pipes are securely and permanently held in fixed relation, so that the size and shape of the outer annular passage 11' remains permanently and uniformly the same.

Figure 3:
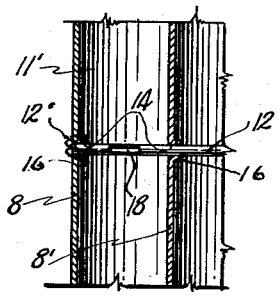
Figure 3 is an enlarged detail view showing engaging portions of the pipes and rod or pin connections at one end of the latter.

Besides providing an efficient anchoring means for securing and maintaining the pipes in the required relationship, the described rod connections also serve a useful function as regards heat-exchange action, which may be further promoted by formation of the openings or holes 14 with burred margins 16—as by a simple piercing operation, see Figure 3—for additional heat-dissipating effect.

The rods 12 may also of course be formed with enlarged or split terminals, with like effect, as indicated by the head portions 12', or the split end portions 12", in Figure 3.

Referring further to Figure 3, this view also illustrates a rod terminal construction in which the end portions of the rods are made of hollow form—as indicated at 18, thereby providing for still further heat-dissipating action, as by convection, at each of the joints between said rods and the corresponding pipe sections.

Figure 4:
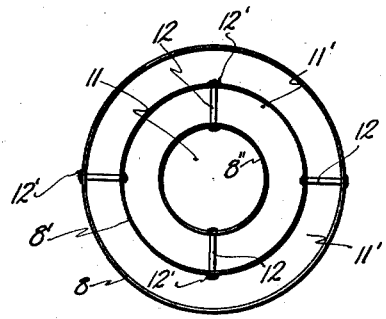
Figure 4 is a plan view similar to Figure 2, but showing a modified form of pipe assembly using shortened forms of rod or pin connections.

While Figures 1 and 2 illustrate the use of full-span rod connections extending entirely across the pipe diameters and thus spanning the central passage 11, the rods may be shortened to dispense with any rod portions inside the inner pipe member 8 and leaving the space within the latter entirely clear where desirable—as represented in Figure 4—which shows also a pipe assembly of three pipe units, it being understood, of course, that the assembly may comprise any number of such pipe units secured together in the same concentric relation as represented in said Figure 4.

Figure 5:
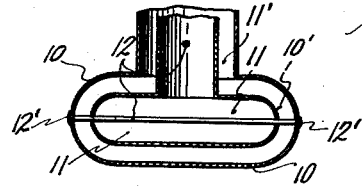
Figure 5 is an elevation illustrating a T-joint assembly of pipe members secured together by rod or pin connections in accordance with my present invention.
Figure 6:
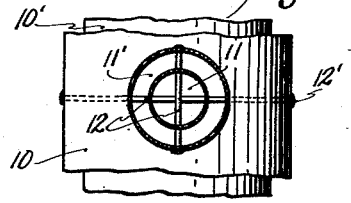
Figure 6 is a plan view of the assembly illustrated in Figure 5.

It will of course be obvious that the methods illustrated for utilizing rod connections in the manner described are readily applicable in other forms of multiple-pipe assemblies, as represented, for example, in a T-joint type of pipe assembly in Figures 5 and 6 and showing the rod elements 12 suitably applied in the necessary angular relation to each other for connecting both branches of the pipes 10 and 10' comprised in said T-joint, and securing the same in the proper spaced relation, as shown.

Figure 7:
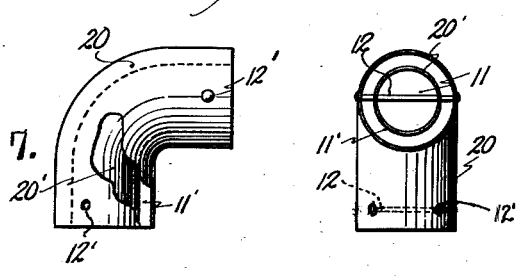
Figure 7 is an elevation illustrating a form of elbow pipe assembly employing rod or pin connections in accordance with my invention.
Figure 8:
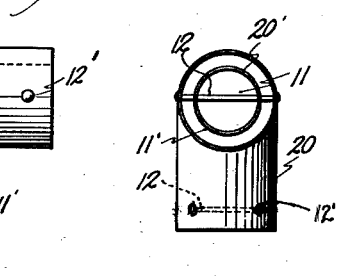
Figure 8 is a view similar to Figure 7, but taken at right angles thereto.

In Figures 7 and 8 is illustrated a further example of multiple-pipe assembly in a conventional elbow form comprising the inner and outer pipe members 20 and 20' and also utilizing the rod elements 12 applied in the necessary angular relation to each other and accomplishing the purpose of retaining the parts in their fixed permanent relation to each other, as illustrated.

It will therefore be apparent that I have devised various practical and efficient types of construction and arrangement for fulfilling the desired objects of my invention, including extreme simplicity of the rod means or connections for the pipe-securing function as well as for holding the same in proper spaced relation; and also that the construction shown is not only adapted for any and all forms and shapes of the pipe units, but also for ready assembly and manufacture by efficient, practical and economical methods of production.

What I claim and desire to secure by Letters-Patent is:

A multiple-wall pipe unit or assembly of the character described, comprising a plurality of pipes arranged in longitudinal telescoping and spaced relation, and a plurality of rod connecting elements traversing the annular space between said pipes and maintaining the same in relatively fixed spaced relation, said pipes being provided with burred openings for said rod elements for promoting heat-exchange action through the medium of said rod connecting elements.

References Cited in the file of this patent

UNITED STATES PATENTS

| | | |
|---|---|---|
| 1,528,859 | Taylor | Mar. 10, 1925 |
| 1,809,538 | Weisshaar | June 9, 1931 |
| 2,076,277 | Reinhart | Apr. 6, 1937 |

FOREIGN PATENTS

| | | |
|---|---|---|
| 372,408 | France | Feb. 18, 1907 |
| 985,036 | France | Mar. 7, 1951 |